United States Patent Office

Re. 25,986
Reissued Mar. 22, 1966

25,986

METHOD FOR PRODUCING NEW SUGARS

Tadayuki Goda, Tokyo, Japan, assignor to Nippon Gosei Kagaku Kabushiki Kaisha, Tokyo, Japan, a company of Japan No Drawing. Original No. 3,066,086, dated Nov. 27, 1962, Ser. No. 16,939, Mar. 23, 1960. Application for reissue Nov. 24, 1964, Ser. No. 429,191
9 Claims. (Cl. 204—158)

Matter enclosed in heavy brackets [ ] appears in the original patent but forms no part of this reissue specification; matter printed in italics indicates the additions made by reissue.

This invention relates to a method for producing new sugars and more particularly to a method for the production of synthetic sugars corresponding to disaccharose from monosaccharose.

An object of this invention is to provide new sugar from sugar solution which is prepared by saccharification, with acid, of purified or refined starch.

Another object of this invention is to provide new sugar from monosaccharose such as glucose, fructose, lactose, mannose and gulose on the market.

Still another object of this invention is to provide new sugar from sugar solution which is prepared by saccharification, with acid, of purified starch, or from monosaccharose such as glucose, fructose, lactose and mannose on the market by the use of specific rays.

Other objects, features and advantages of this invention will be apparent from the following detailed description.

[The characteristic] *Characteristic* features of this invention [consist of] *comprise*

(1) Method in which sugar solution produced by hydrolysis of purified or refined starch is divided into two portions, preferably two equal portions, one portion of which is illuminated with rays or beams of light which [is] *are* generated or emitted from a [photo-electric cell] *particular ray generating and emitting tube, referred to hereinafter as a ray emitting tube,* and [has] *have* wave lengths of from 0.14 micron ($\mu$) to 20 millimicron (m$\mu$), and then this treated portion is mixed with the other remaining portion and thereafter the mixture is admixed with [kaoline] *kaolin* as a catalyst in a catalytic amount, and the mixture thus obtained is illuminated through a specific or special filter with rays which are simultaneously generated from a light emitting tube or luminous tube and [photo-electric cell] *a ray emitting tube* and have wave lengths of from 0.47$\mu$ to 20 m$\mu$, and then the said sugar solution is concentrated, whereby the desired sugar, disaccharose can be obtained by crystallization;

(2) Method in which aqueous solution of monosaccharose such as glucose and fructose on the market is divided into two portions, preferably two equal portions, one portion of which is illuminated through a specific or special filter with rays which are generated or emitted from [photo-electric cells] *a ray emitting tube* and have wave lengths of from 0.14$\mu$ to 20 m$\mu$, the mixed solution of the treated portion and the other remaining portion is further illuminated through specific filters with rays which are generated or emitted from a light emitting tube and [photo-electric cell] *a ray emitting tube* and have wave lengths of from 0.47$\mu$ to 20 m$\mu$, the solution thus treated is further decolorized and concentrated under reduced pressure, whereby the desired sugar, disaccharose can be obtained by crystallization and (3) Method in which sugar solution, which is produced by acid-hydrolysis of purified starch obtained in such a manner that a high-tension electric current is passed through a high-tension mercury tube at which time fresh water is passed over its contact surface and the initial starch is poured into the water thus treated and stirred, after which the starch is repeatedly dehydrated and washed, is divided into two portions, preferably two equal portions, one portion of which is illuminated through a specific filter with rays having wave lengths of from 0.14$\mu$ to 20 m$\mu$, and then a mixture of the said treated portion and the other remaining portion is admixed with a small quatity of kaolin and the mixture thus obtained is further illuminated through a specific or special filter with rays having wave lengths of from 0.47$\mu$ to 20 m$\mu$, and thereafter concentrated, whereby the desired synthetic sugar corresponding to disaccharose is obtained.

The present inventor has executed numerous experiments and [laborous] *laborious* studies for a long time in regard [with] *to* the influence of various kinds of rays or beams of light upon the substances and thus has [succeeding] *succeeded* in producing synthetic sugar corresponding to disaccharose from acid-saccharified solution of starch by utilizing rays having specific wave lengths.

According to wave length, there are visible rays, violet rays, ultra-violet rays, Rontgen rays and so on and the wave length ranges of these rays are shown as follows:

| | |
|---|---|
| Visible rays | 0.38$\mu$~0.87$\mu$ |
| Violet rays in visible rays | 0.47$\mu$~0.38$\mu$ |
| Ultra-violet rays | 0.38$\mu$~0.185$\mu$ |
| Rontgen rays | 20 m$\mu$~10 m$\mu$ |

As the wave lengths of the rays to be used in the first place in the present invention [is] *are* from 0.14$\mu$ to 20 m$\mu$, they lie between ultra-violet rays and Rontgen rays. It has been found that when sugar solution obtained by acid-hydrolysis of starch is illuminated with the [acid] *said* rays, d-glucose in the sugar solution is converted to levorotatory sugar, and further according to the variation of intensity of ray and illuminating period a new levorotatory sugar can be obtained. Moreover, as the wave lengths of the [ray] *rays* to be used secondly in the present invention [is] *are* from 0.47$\mu$ to 20 m$\mu$, these rays lie between violet rays belonging to a part of visible rays and Rontgen rays. It has also been found that the said rays can combine one molecule each of d-glucose and levorotatory sugar to produce crystals or combine one molecule each of d-glucose and dextro-rotary sugar to produce crystals. Even though the fact that synthetic sugar corresponding to disaccharose may be obtained from monosaccharose such as glucose by the action of special or specific rays as described above is difficult to understand by present chemical knowledge, the results obtained from numerous experiments prove distinctly the above fact to be true and it would be apparent that its industrialization is possible.

In this invention, starch is first saccharified with acid in a conventional method, and the resultant sugar solution is then neutralized, decolorized, filtered, and thereafter divided into two portions, preferably two equal portions, one portion of which is illuminated with special rays and the other portion remains unilluminated. This is for the purpose that one molecule each in both sugar solutions combine together, and so it is reasonable that the sugar solution is divided into two equal portions as set forth above, and treated. Synthesis of the disaccharose can take place as a matter of course, even when the sugar solution is not divided into two equal portions, but the greater the proportional difference of two portions the more uncombined [moleculars] *molecules* remain and, consequently the yield of disaccharose becomes lower. Thus, it is not absolutely necessary to [divided] *divide* the sugar solution into two equal portions, but in consideration of the above mentioned points it is prescribed in the present invention that the sugar solution is preferably divided into two equal portions and then one portion is treated with rays.

Specific rays having wave lengths of from 0.14$\mu$ to 20 m$\mu$, which are used in this invention, can be generated or emitted by passing a high-tension or high voltage current through a [light] *ray* emitting tube which is made by tightly attaching [a lead wire] *electrodes* composed of molybdenum and tungsten respectively to the both ends of a rock-crystal [bulb] *tube* or crystallized quartz [bulb] *tube* in which a light emitting body made by heating uranium and thorium, or uranium, thorium and cesium in vacuo and amalgamating the heated mixture by the addition of mercury is located after being bonded at both its ends to the said [lead wire] *electrodes* respectively. When these rays are [illuminated] *directed* to the saccharified solution of starch, d-glucose in the said solution is converted to levorotatory sugar and d-glucose becomes dextro-rotatory type, at which illumination if the sugar solution be subjected to the radiating heat by infra-red rays or heated by high-frequency rays, these conversions can be carried out in a very short time.

In this invention, the solution of levorotatory sugar converted by the above mentioned treatment and the not-treated sugar solution are mixed together and the mixed solution is illuminated further with rays having wave lengths of from 0.47$\mu$ to 20 m$\mu$ in the presence of a small proportion of kaolin. The said rays can be generated or emitted by passing a high-voltage current through a [photo-electric cell] *ray emitting tube* made by mixing thorium, cesium, mercury and helium in an appropriate proportion and sealing the amalgamated mixture in [a] *an* evacuated rock-crystal [bulb] *tube*, and a light emitting tube can be made by sealing a filament of tungsten and thorium or uranium in [a] *an* evacuated rock-crystal [bulb] *tube*. Thus, according to this step one molecule each of d-glucose and levorotatory sugar, or one molecule each of d-glucose and dextro-rotatory sugar can be combined together completely. As kaolin is used in this reaction as catalyst, its amount to be added is sufficient in a small quantity, and its catalytic action provides the complete combination and accelerates the reaction. The solution of synthetic sugar thus obtained is decolorized with active carbon and then filtered, and the obtained clear solution is concentrated under reduced pressure, thereby crystals are obtained upon some concentration. In case crystals are to be obtained from a solution of cane-sugar and the like, it has been required to effect the cooling of the solution at a determined concentration, whereas in the case of the present invention it is to be noted that the [crystalization] *crystallization* takes place at even 50 to 70° C. of solution temperature without cooling. The crystals of the synthetic sugar obtained belong to a hexagonal monoclinic system and correspond to disaccharose. The mechanism of conversion of d-glucose to levo- or dextro-rotatory sugar and synthesis of disaccharose by the above-mentioned two kinds of rays are difficult to separate, but the process and the results of the executed experiments are remarkably distinct.

Furthermore, the present inventor has found that the aforesaid effects of two kinds of the specific rays are applicable to the synthetic production of disaccharoses from the monosaccharoses such as glucose, fructose, lactose, talose, gulose and mannose in the same manner as in the above mentioned production of synthetic sugar corresponding to disaccharose from the sugar solution of the starch; that is, the present inventor came to the conclusion that when a solution of the monosaccharoses as described above, for example, a purified glucose solution is illuminated with rays having wave lengths of from 0.14$\mu$ to 20 m$\mu$, namely rays having wave lengths between the ultra-violet rays and Rontgen rays, the glucose is converted to levorotatory sugar and further that with variation of intensity of rays and illumination time a new dextro-rotatory sugar can be obtained. This is the same for other monosaccharoses such as fructose, lactose, talose, gulose, mannose and the like. Also, it has been found that when rays having wave lengths of from 0.47$\mu$ to 20 m$\mu$, namely rays between violet rays belong to a part of visible rays and Rontgen rays are used as the second illuminating rays, one molecule each of glucose and its levorotatory sugar obtained by the above-mentioned treatment, or one molecule each of glucose and its dextro-rotatory sugar can be combined together by these rays. This is, of course, the same for fructose, lactose, talose, gulose, mannose and the like, and further even in case of [the] each combination of different monosaccharoses such as glucose and fructose, fructose and lactose, lactose and mannose, talose and gulose and talose and glucose, the desired combining reaction for disaccharose can similarly be expected under corresponding conditions. It also may not be easily understood by chemical knowledge at the present time that disaccharoses can be synthesized from monosaccharoses by the action of special rays as mentioned above, but the results of the experiments are very distinct and it has been found that its industrialization is possible.

The aforesaid rays having wave lengths of from 0.14$\mu$ to 20 m$\mu$, which are used in this invention, can be generated by passing a high voltage current through the above-mentioned [light] *ray* emitting tube. When radiating heat by infra-red rays or heating by high-frequency *rays* is used together at the time of illuminating glucose solution with these rays, the conversion of glucose to levo- or dextro-rotatory sugar can be completed in a very short time.

According to this invention, the solution of levorotatory sugar of glucose obtained by the above-mentioned treatment and the not-treated glucose solution are mixed together in a substantially equal volume and *to* the mixture is added [with] a small quantity of kaolin as catalyst, after which the mixed solution is illuminated with rays having wave lengths of from 0.47$\mu$ to 20 m$\mu$. These rays can be generated from the above-mentioned [photo-electric cell] *ray emitting tube* and *a* light emitting tube. By this process one molecule each of glucose and its levorotatory sugar or one molecule each of glucose and its new dextro-rotatory sugar can combine together completely, and in the case of fructose solution one molecule each of fructose and its levorotatory sugar, or one molecule each of fructose and its new dextro-rotatory sugar can combine together completely, too. This is the same for other monosaccharoses. As mentioned above, kaolin is added as catalyst, and if at the same time special rays having wave lengths of from 0.18$\mu$ to 0.12$\mu$ are further used for the illumination of the kaolin, its catalytic effect is not only extremely intensified but also the combining reaction becomes more complete and its velocity can be accelerated. On concentrating the sugar solution thus obtained, under reduced pressure, the desired crystals are obtained at the determined concentration and the crystals of synthesized disaccharose are of hexagonal monoclinic system.

In the production of synthetic sugar corresponding to disaccharose from acid-saccharified solution of starch on the market, removal of dust and water-soluble impurities contained in the initial starch on the market is comparatively easy, whereas water-insoluble impurities, raw proteins, raw fats, organic substances produced by fermentation and the like can not be removed technically without difficulty, and any suitable method for this purpose has not hitherto been suggested. The present inventor has solved this problem and succeeded in *easily* removing [easily] water-insoluble impurities, raw proteins, raw fats, organic substances produced by fermentation and the like contained in the initial starch, by passing a high-tension electric current through a high-tension mercury tube, at which time fresh water is passed over its contact surface; pouring the initial starch into the water thus treated and stirring the starch, after which the starch is repeatedly dehydrated and washed, thereby purified starch suitable for starting material of millet-jelly, glucose and other sugars can be obtained.

According to this invention, when at the time of purification of starch, water is passed over a contact surface of the high-tension mercury tube [being passed] through [by] *which* a high-voltage current[,] *is passed,* a hydrogen suboxide is produced on the contact surface by the action corresponding to [the] non-polar electrolysis. Further, it has been found that this nascent hydrogen suboxide is not only excellent in making raw proteins and raw fats soluble in water by its specific reducing power, but also has an action for solubilizing water-insoluble impurities and organic substances produced by fermentation. Consequently, when starch is poured into the treated water and stirred for about 30 minutes, the impurities contained in the starch, namely, raw proteins, raw fats and the like are dissolved out in water, and other water-insoluble impurities and organic substances produced by fermentation become easily water-soluble, so that all these impurities can be removed by centrifugal [hydroextration] *hydroextraction.* When the starch thus treated is washed with pure water and then dehydrated, *and* the remaining treated water and solubilized impurities are removed completely, [and thus] pure starch can be obtained easily. Even very crude starch can reach its highest purity, if these processes, namely, the treatment of starch in the treated water and the centrifugal separation are repeatedly carried out.

The present inventor has also executed numerous experiments for a long time with regard to the material permeable to specific or special rays having wave lengths of from $0.47\mu$ to $18\mu$, namely, rays between violet rays [belongng] *belonging* to a part of visible rays and Rontgen rays, and has found that silicon dioxide obtained from the central part of raw rock-crystal has most excellent permeability to the said rays and *is* suitable for this purpose.

As the natural source of the silicon dioxide, there are rock-crystal, tridymite, chalcedony, opal and so on, and among them the rock-crystal has been considered to be the purest silicon dioxide, but it is apparent [by the] *from* Challa's report (1958) of the William Laboratories in Germany that the silicon dioxide contains other substances [beside] *besides* silicon dioxide. According to the present inventor, it has been found that the rock-crystal contains other substances [beside] *besides* silicon dioxide in its outside portion to some extent, but its central portion consists of comparatively pure silicon dioxide, and further that this tendency is more remarkable in the rock-crystal native to Brazil. In this invention, therefore, raw rock-crystal is crushed, the outside portion is removed and only the crystal solid of the central portion is used. Owing to its high content of other substances [beside] *besides* silicon dioxide, the outside portion is difficult to purify so that the said portion is not suitable for use. The crystal solid of the central portion is pulverized to powder with a stainless steel roller while applying water. To this powder is added [a] nitric or hydrochloric acid to remove the impurities soluble in acid. As the silicon dioxide is not affected with other acid than hydrofluoric acid, almost pure silicon dioxide can be obtained by this acid treatment. This pure silicon dioxide is fused by heating at a temperature above 2300° C. and then the fused silicon dioxide is spouted through nozzles to produce cotton-like material. It has been said that the rock-crystal is fused at about 1710° C. and vaporized at 2230° C. in an electric furnace. However, in consideration of the fact that the silicon dioxide to be used in the present invention commences to fuse only at a temperature above 2300° C., it will be evident that the silicon dioxide thus obtained is extremely pure. The reason for making the silicon dioxide into cotton-like material is in that in the following purification by acid washing the washing can effectively be carried out and in casting and heating it can be easily fused. When the cotton-like silicon dioxide thus obtained is cast in [the] *a* plate-type, pipe-type or [bulb] *tube*-type mold and the casting is heated at a high temperature, and the heating is stopped just before its fusion, [the] *a* transparent plate, pipe or [bulb] *tube* of silicon dioxide can be obtained. In this invention, the plate, pipe or [bulb] *tube* thus obtained is used as material for a filter, *a* [photo-electric cell] *ray emitting tube* or *a* light emitting tube. The wave length of ultra-violet rays as generally known is between $0.38\mu$ and $0.185\mu$, but the present inventor has ascertained the existence of rays corresponding to ultra-violet rays having wave lengths ranging from $0.18\mu$ to $0.12\mu$ by the observation of line absorption spectrum of sunlight as well as by spectrum analysis of corona at a solar eclipse and has found that the said rays can be utilized industrially in synthesis of disaccharose. However, as there has not been any literature regarding the method for the artificial generation of these rays, the present inventor has been occupied in this problem and succeeded in achieving this purpose by the use of the said light emitting tube and [photo-electric cell] *ray emitting tube* in the present invention. In this invention it has been found that the specific rays having wave lengths of from $0.18\mu$ to $0.12\mu$ can strongly be generated by passing a high-voltage current through the light emitting tube obtained by sealing a filament consisting of a mixture of tungsten with high purity and radioactive substances with high purity such as thorium or uranium in the said evacuated [bulb] *tube*, but these rays are easily absorbed and the [bulb] *tube* made of the usually known material are not permeable to these rays. In this invention, therefore, silicon dioxide obtained from the central portion of raw rock-crystal is used as the specific material permeable to these rays.

As the higher the degree of vacuum in the said [bulb] *tube*, at the time when the said filament connected with [lead wires] *electrodes* is sealed, the more intensive are the rays generated, thus, it is desirable to maintain the interior of the [bulb] *tube* at high vacuum by replacing air in the [bulb] *tube* with mercury [vapour] *vapor.*

The [lead wire] *electrode* used in this invention is attached to the [bulb] *tube* by the fused glass and its one end is slightly inserted in the [bulb] *tube*. In order to satisfy the condition in which this [lead wire] *electrode* is resistant to high temperature and good electric conductor and not easily oxidized, a mixture of molybdenum and iridium, molybdenum and platinum or molybdenum and thulium is used for the raw material of the [lead wire] *electrode* in the present invention.

As mentioned above, the present invention has executed laborious studies with regard to the influence of various kinds of rays upon substances, and has found that rays which have wave lengths ranging from $0.14\mu$ to 20 $m\mu$, namely rays between ultra-violet rays and Rontgen rays contribute to convert dextro-[rotatary] *rotatory* sugar to levorotatory sugar and can widely be utilized in the industrial field, and has completed the [photoelectric cell] *ray emitting tube* which is able to generate or emit the said specific rays. Further, it has been found that when the lattice of radioactive metal is [applied with] *subjected to* high-frequency rays or afforded the particles of heat- or ion-exchangeable material and then [passed through by] an electric current *passed therethrough,* rays (elementary particle) having the same wave length as the strong active ultrashort wave are generated. As the result of these experiments this inventor has succeeded in generating the desired light flux of electromagnetic wave, by passing an electric current of 1500 v. and 10 amp. through the said [cell] *tube* in which an amalgam of mercury and the radioactive metals such as thorium, uranium or cesium is sealed under high vacuum, and the generation or emission of these rays can be detected with the measuring device for electromagnetic wave and certified by the oscillograph.

The said rays, however, are very easily absorbed and can not permeate the [bulb] *tube* made of the usually known material. In this invention, therefore, silicon dioxide obtained from the central portion of rock-crystal is used as special material permeable to the said rays as mentioned above, and the desired [bulb] *tube* has been made of this silicon dioxide material.

In this [bulb] *tube* is sealed an amalgamated material of the radioactive substance such as thorium, uranium or cesium and mercury as carrier for thermal photoelectron and [lead wire] *electrodes* composed of molybdenum and tungsten [is] *are* respectively fastened to [the both end] *both ends* of the said [bulb] *tube* with fused glass. The [photo-electric cell] *ray emitting tube* used in this invention is obtained by replacing air in the [bulb] *tube* with argon gas.

This invention is further described in the following examples, which serve to illustrate the method for the production of new sugars of the present invention.

EXAMPLE 1

To 1 kg. of sweet potato starch on the market was added water and [emulsified] *slurried* to the extent of 20.5° Bé., and 9 gr. of [axolic] *oxalic* acid was further added thereto. This mixture was then saccharified in a saccharifying vessel at 128° C. and under a pressure of 2.6 kg./cm.$^2$ for about 50 minutes, and after certifying the degree of saccharification by [idoine] *iodine* reaction or alcoholic reaction the reaction mixture [is] *was* transferred into a neutralizing vessel and neutralized with calcium carbonate to a pH of about 5.4, and then filtered with *a* filterpress. The clear sugar solution thus obtained was divided into two equal portions at the time of the [transfusion] *transference* into a reservoir, one portion of which was illuminated, while being circulated through a left-hand screw threaded tube, with rays having wave lengths of from 0.14$\mu$ to 20 m$\mu$ and generated from the said [photo-electric cell] *ray emitting tube* in [the] *a* weak electromagnetic field for about 30 minutes, to convert the said solution of the levorotatory sugar solution. The levorotatory sugar solution thus obtained was mixed with another not-treated sugar solution, and then 4 gr. of crystalline kaolin was added to the said mixed solution, after which the mixture was illuminated, while being circulated through a synthesizing tube, with rays having wave lengths of from 0.47$\mu$ to 20 m$\mu$ and generated from the said [photo-electric cell] *ray emitting tube* and light emitting tube in [the] *a* strong electromagnetic field or in [the] *an* electrostatic field for 30 to 60 minutes. After completion of synthesis the reaction mixture was decolorized with 7 gr. of active carbon and filtered with *a* filter press. The clear solution thus obtained was concentrated in vacuo to 40.5° Bé. by forced feed of compressed gas, and then the final product was crystallized out and obtained in the form of crystals. The product thus obtained belongs to *the* ketose *class* and is sweeter than cane sugar and is less hygroscopic but easily soluble in water.

EXAMPLE 2

To 1 kg. of purified glucose on the market was added water to the extent of solution of 26° Bé. This solution was divided into two equal portions, one portion of which was illuminated, while being circulated through a left-hand screw threaded tube, with rays having wave lengths of from 0.14$\mu$ to 20 m$\mu$ and generated from the said [photo-electric cell] *ray emitting tube* in [the] *a* weak electromagnetic field for 45 minutes to produce levorotatory sugar solution. The levorotatory sugar solution thus obtained was mixed with another not-treated glucose solution, and *to* the mixture was added [with] 4.5 gr. of kaolin. The said mixed solution was illuminated, while being circulated through a synthesizing tube, with rays having wave lengths of from 0.47$\mu$ to 20 m$\mu$ and generated from the said light emitting tube and [photo-electric cell] *ray emitting tube* in [the] *a* strong electromagnetic field or in [the] *an* electrostatic field for 65 minutes. After completion of synthesis the reaction mixture was decolorized with 4 gr. of active carbon and then filtered with *a* filter-press. The clear solution thus obtained was concentrated in vacuo to 41° Bé. and then [transfused] *transferred* into a crystallizing vessel at the same time as forced fed by gas and the product was crystallized therein. The final product, disaccharose, was obtained by filtration and dried.

EXAMPLE 3

500 gr. of pure glucose obtained by recrystallization of crude glucose on the market was dissolved in water to produce a sugar solution of 26° Bé. This sugar solution was illuminated, while being circulated through a lefthand screw threaded tube, with the same rays as in Example 2 in [the] *a* weak electromagnetic field for 50 minutes to convert the sugar solution to levorotatory sugar solution. Separately, fructose on the market was added with water and then decolorized to produce a 26° Bé. clear sugar solution. This sugar solution was mixed with the said converted sugar solution and the mixture was further admixed with kaolin illuminated for 30 minutes with the rays having wave lengths of from 0.18$\mu$ to 0.12$\mu$. The mixture thus obtained was, while being circulated through a synthesizing tube, with the same rays as in Example 2 in [the] *a* strong electromagnetic field for 60 minutes. After completion of synthesis the reaction mixture [is] *was* decolorized with 5 gr. of active carbon and then filtered with *a* filter-press. The clear sugar solution thus obtained was concentrated in vacuo to the extent of 41.5° Bé. and [transfused] *transferred* into a crystallizing vessel at the same time as forced [feed] *fed* by gas. The final product, disaccharose, was crystallized out and collected by filtration and dried.

The products thus obtained by the method in Examples 2 and 3 belong to *the* ketose *class*, and their taste and sweetness resemble those of cane sugar and are synthetic sugars which have great utility.

EXAMPLE 4

Into the treated water obtained by passing a high-voltage current, for example 1000 v. and 10 amp. through a high-tension mercury tube and at the time passing water over the contact surface of the said mercury tube, was poured 10 kg. of sweet potato starch and then stirred for 30 minutes. This mixture was separated from undissolved impurities such as raw fibre by a 180 mesh rotating sieve, after which impurities dissolved in the treating water and starch were separated from each other by a centrifugal separator. The starch thus treated was washed with pure water in a washing tank while thoroughly stirred and then dehydrated. The purified starch thus obtained was added with water to produce a 21° Be'. milky [solution] *slurry*. This milk-like [solution] *slurry* was [transfused] *transferred* into a saccharifying vessel, and the desired synthetic sugar was obtained by treating the said solution in the same manner as in Example 1.

Moreover, the following examples illustrate for reference the way in which methods for manufacturing the filter, the light emitting tube and the [photo-electric cell] *ray emitting tube* to be used in the present invention may be carried out in practice.

Reference Example 1

100 kg. of Brazilian rock-crystal was crushed and the outside portions were removed, and then 1420 gr. of crystal solid of the central portion of the said rock-crystal was obtained. This crystal solid was further pulverized to powder with a stainless roller. The powder was submitted to the flotation process and 500 gr. of the powdered silicon dioxide of good quality was obtained. This powdered silicon dioxide was mixed with nitric acid to remove the soluble impurities, after which the said powder thus treated was fused at 2400° C. and spouted through nozzles to give cotton-like material. This cotton-like material was further washed with nitric acid, and then formed in the shape of a plate. The plate thus formed was heated by *an* oxyhydrogen burner in a high-frequency electric furnace, and when the heating was stopped just before its fusion, the desired transparent plate was obtained which can be used as filter plate in this invention.

It has been ascertained by the measurement that the permeability of this filter plate to the specific rays as already described above was more than 87%.

Reference Example 2

100 kg. of Brazilian rock-crystal was crushed and after removing the outside portions, 1420 gr. of crystal solid of the central portion was obtained. This crystal solid was then pulverized to powder with a stainless roller and 500 gr. of good quality was obtained after subjecting to the flotation process, and then impurities soluble in nitric acid were removed by treating with nitric acid. This purified powder was fused by heating at 2400° C. and then spouted through nozzles to produce cotton-like material. After further washing with nitric acid this material was formed in the shape of [bulb] *a tube,* and thereafter heated with an oxyhydrogen burner in a high-frequency electric furnace and when the heating was stopped [at] just before its fusion, the desired transparent [bulb] *tube* was obtained. Separately, tungsten was dissolved in nitric acid and the tungsten solution was concentrated. After the impurities were completely removed as salts of nitric acid by crystallization process and the concentrate was purified after nitric acid ion was removed completely with primary alkyl amine by the ion-exchange principle, [thereby, the] tungsten powder of high purity was obtained. Powder of pure thorium can be produced in the same manner as that in the tungsten powder. Both powders were mixed in an equal amount and then this mixture was formed in the shape of a thready filament and then [burned] *fused* to the filament, after which [this] *such* filament was [respectively] connected with [a lead wire] *electrodes* composed of molybdenum and iridium respectively. This filament with [lead wires] *electrodes* was sealed in the aforesaid [bulb] *tube* and [the] lead wires were [further] attached to the [bulb] *electrodes* [with] *through* fused glass. In order to produce a high vacuum in the [bulb] *tube,* a deaerating hole was provided on the [bulb] *tube* and the [bulb] *tube* was filled with mercury vapor, and air in the [bulb] *tube* was exhausted by vacuum pump. The said hole was hermetically closed after these procedures. Thus, the desired light emitting tube was obtained.

Reference Example 3

100 kg. of Brazilian rock-crystal was crushed and the outside portions were removed. 1420 gr. of crystal solid of the central portion was obtained. This portion was pulverized to powder with *a* stainless roller and 500 gr. of the crystal solid of good quality was obtained by the flotation process. Impurities soluble in nitric acid were completely removed by treating the said crystal solid powder with nitric acid, after which the powder was heated and fused at 2400° C. When the fused material was spouted through nozzles, there was obtained a cotton-like material. This cotton-like material was formed in the shape of *a* [bulb] *tube* after further washing with nitric acid, and [burned] *heated* with *an* oxyhydrogen burner in a high-frequency furnace, and when the heating was stopped at just before its fusion, the desired transparent [bulb] *tube* was obtained. Separately, a mixture of uranium, thorium, and cesium was heated and the mixture was amalgamated by the addition of mercury. This amalgamated material was located in the said [bulb] *tube* and [a lead wire] *electrodes* composed of molybdenum and tungsten [was] *were* respectively attached to the both ends with fused glass. Air in the [bulb] *tube* was replaced with argon gas, at which time the volume of air was maintained at below $5/10,000$ mm. Thus, the desired [photo-electric cell] *ray emitting tube* was obtained.

What I claim is:

1. The method for the production of saccharose from starch, which comprises dividing a sugar solution obtained by the hydrolysis of purified starch into two substantially equal portions; exposing one portion thereof to rays having [a] wave lengths of from 0.14μ to 20 mμ generated from a [photo-electric cell] *ray emitting tube*; mixing the treated portion with the non-treated portion; adding kaolin to the resulting mixture as a catalyst in a catalytic amount; exposing the admixture to the action of rays having wave lengths of from 0.47μ to 20 mμ generated simultaneously from a [photo-electric cell] *ray emitting tube* and a light emitting tube; and then concentrating the sugar solution thus treated.

2. The method for the production of saccharose from starch as in claim 1, wherein the said purified starch is obtained by removing from [the] commercial raw starch, water-insoluble impurities, raw proteins, raw fats and organic substances produced by fermentation.

*3. The method of producing disaccharose from a substance from the group consisting of hydrolyzed starch and monosaccharoses which comprises exposing said substance successively to rays having wave lengths of from 0.14μ to 20 mμ generated by a ray emitting tube and to rays having wave lengths from the range of 0.47μ to 20 mμ generated simultaneously by a ray emitting tube and a light emitting tube, and concentrating the solution thus obtained.*

*4. Process according to claim 3 wherein said substance is heated during treatment by means of electromagnetic rays which have wave lengths greater than visible rays.*

*5. Process according to claim 3 wherein treatment is carried out in an electromagnetic field.*

*6. The method of producing a levo-rotatory sugar from a substance selected from the group consisting of hydrolyzed starch and monosaccharoses which comprises illuminating said substance with rays having wave lengths within the range of 0.14μ to 20 mμ and being generated by a ray emitting tube.*

*7. Process according to claim 6 wherein said substance, during illumination, is heated by electromagnetic rays which have wave lengths greater than visible rays.*

*8. Process according to claim 6 wherein the illumination is carried out in an electromagnetic field.*

*9. Process according to claim 3 wherein treatment of said substance is carried out in an electrostatic field.*

References Cited by the Examiner

The following references, cited by the Examiner, are of record in the patented file of this patent or the original patent.

UNITED STATES PATENTS

| | | | |
|---|---|---|---|
| 2,121,981 | 6/1938 | Prudhomme | 204—158 |
| 2,275,745 | 3/1942 | Eastman | 250—86 |
| 2,934,481 | 4/1960 | Ruskin | 204—154 |
| 3,039,362 | 6/1962 | Dobrowolski | 88—106 |

HOWARD S. WILLIAMS, *Primary Examiner.*

JOHN H. MACK, *Assistant Examiner.*